Sept. 22, 1936.  G. A. DAVIDSON  2,055,004

TUBE TEMPERATURE INDICATOR

Filed Oct. 8, 1934

Inventor
George A. Davidson
By *JN Adams*
Attorney

Patented Sept. 22, 1936

2,055,004

UNITED STATES PATENT OFFICE 2,055,004

TUBE TEMPERATURE INDICATOR

George A. Davidson, El Segundo, Calif., assignor to Standard Oil Company of California, San Francisco, Calif., a corporation of Delaware Application October 8, 1934, Serial No. 747,482

5 Claims. (Cl. 73—32)

This invention relates to a temperature measuring device, and particularly to one adapted to be used in connection with the metal tubes in an oil heating furnace, to give a positive and visual indication of the operating temperature of the said tubes.

In the operation of tubular oil heaters, such as those used for liquid phase cracking of petroleum, it is very essential that the temperature of the tubes be kept below certain limits, to prevent excessive decomposition of the fluid in the tube with resultant coke and gas formation. Another and more important factor is that of the physical condition of the metal of the tube, particularly where the non-corrosive alloys, such as chromium-nickel-iron, are utilized. Certain of these are quite strong, tough and ductile so long as they are not overheated, but have a critical temperature of about 1200° F., at which they lose their strength and become weak and brittle. Inasmuch as the tubes in such a heater may be operating full of oil and gas and at pressures up to 1000 pounds per square inch, a tube failure due to any cause may result in a serious fire or explosion, that will not only jeopardize the safety of the operators but may destroy valuable equipment.

Heretofore, various expedients for determining tube operating temperatures have been tried, such as thermocouples welded to the tube wall, optical pyrometers, etc. The thermocouples require an elaborate and expensive system of wiring and delicate electrical instruments and are subject to rapid deterioration and burning off during long runs, leaving the operator with no guidance whatever as to tube wall conditions. Furthermore the relatively thin lead wires are easily damaged during cleaning periods, from vibrations set up by tube cleaners, repairs to refractory walls, and the like. Optical pyrometers are adversely affected and rendered inaccurate by the hot gases in the furnace chamber, the radiation from the refractory walls, etc., and are of little value in indicating the true temperature of the tube walls in this type of service.

This invention, however, depends upon the change of color due to the temperature of heated metal studs or pegs, attached at intervals along the tubes, as by being welded thereto, and which are visually observed by the fireman or operator as frequently as may be desired. They involve no wiring or supplementary instruments, are readily and economically installed and removed, and have proved to be quite rugged, simple and reliable guides as to the temperature of the tubes, thus permitting them to be operated at maximum efficiency and with a minimum likelihood of failure.

It is an object of this invention to provide a simple and economical means for indicating safe maximum temperatures of tube walls of tubular heaters, such as liquid phase pressure stills.

Another object is to provide a means for visually determining the temperature gradient along a given tube as may be caused by localized carbon or coke deposition therein, which may interfere with the transmission of heat through the tube to the fluid passing through the same, and cause the tube to be overheated at that point, while adjacent areas are at safe operating temperatures.

Another object is to provide a means for economically indicating the temperature of a pressure still tube at a plurality of points, which means may readily and cheaply be installed and replaced, and which will not require either expensive supplementary apparatus, continuous maintenance, or expert manipulation.

These and other objects and advantages will become further apparent from the following description, and from the accompanying drawing, which forms a part of this specification and illustrates a preferred embodiment of this invention, together with several alternative forms thereof.

In the drawing, Figure 1 is a transverse sectional view of a pressure still tube with a number of temperature indicating studs or pegs welded thereto.

Figure 1:
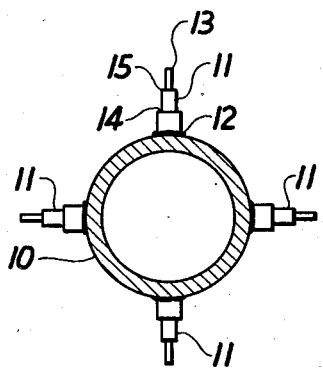
Figure 2:
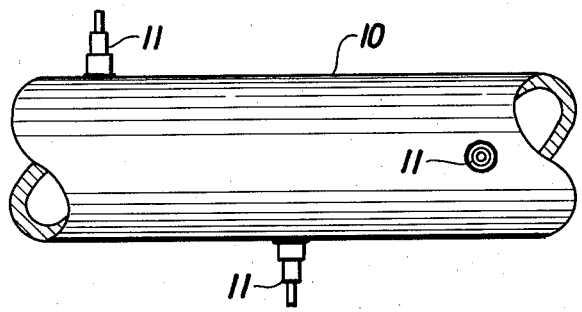
Figure 2 is a side elevation view of a portion of a pressure still tube with a plurality of pegs welded to its outer surface.

Referring to the drawing, and particularly to Figures 1 and 2, the numeral 10 represents the tube to which the studs or pegs 11 are attached, as by welding at their bases 12. Each stud 11 is preferably progressively reduced in diameter from the base 12 to the tip 13, as by steps 14 and 15. If desired, the reduction in cross-sectional area may be uniform as from base 12' to tip 13' of the stud 11' of Figure 3. It has also been found that a simple cylindrical stud as shown at 11" of Figure 4, will give quite satisfactory results, as will be explained below.

Studs 11 may be welded, as shown in Figure 2, at the desired intervals along those tubes most exposed to the heat, and particularly the radiant heat of a pressure still furnace, and are preferably so positioned that they are visible throughout their length from the observation ports or "peep-holes" common to such furnaces. Both the tube 10 and pegs 11 are in heat absorptive relation to the hot gases and/or radiating surfaces in the furnace. Due to the relatively larger area of the body of the peg which is exposed to the absorption of heat as compared to the area at the base 12 through which the heat is being carried away to the tube 10, the peg will be at a higher temperature than the tube. The tip 13 of the peg 11 will obviously attain the highest temperature and will, therefore, become red hot before the rest of the peg or the tube.

The apparent color of such a peg and the tube to which it may be attached will depend on several factors. In a furnace with a bright high fire the appearance of a red hot or semi-incandescent body will be different than when a low or non-luminous fire is carried. The materials of the tubes and the pegs also affect the appearance. Carbon steel tubes have a different color when at or near a red heat than the corrosion-resisting alloy tubes such as chromium-nickel-iron, probably due to the oxide films thereon. Preferably the pegs 11 are of the same material as the tube 10, and it will be found that a quite noticeable difference in appearance will be observed between the red or semi-incandescent tip 13 of the peg 11 and the normal color of the tube 10.

As the temperature of the tube increases and approaches redness, which may indicate the critical temperature, less heat is absorbed from the body of peg 11, and the different color of the peg will extend closer to the tube, until the tube temperature approximates 1200° F., when the distinctive appearance or color of the peg will have reached the junction point or base 12. From this indication it is very easy to detect a tube or any portion of a tube which is operating above the desired maximum, by a simple visual observation of the peg colors.

In one application, where the critical point below which the tube wall temperature was to be kept was about 1200° F., the studs 11 were ¾" in diameter at the base and ¼" in diameter at the tip, when made in the stepped forms of Figures 1 and 2, and were about 2 inches in length. Simple cylindrical forms such as that of Figure 4, of ⅜" diameter and 2" length, were also found to operate satisfactorily.

Figure 3:
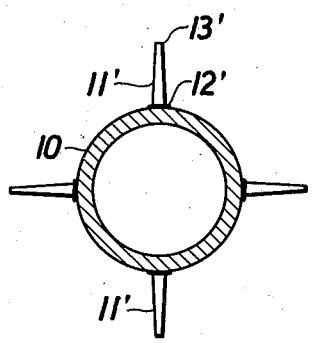
Figure 3 is a sectional view similar to Figure 1 and shows an alternative form of the studs.
Figure 4:
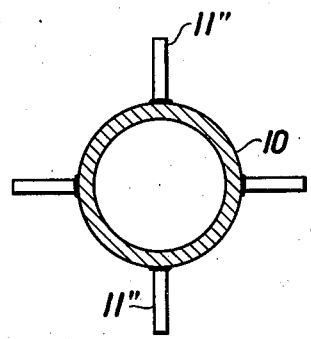
Figure 4 is also a transverse sectional view of a tube with a simpler and still different form of temperature indicating studs, in which the diameter is constant throughout.

If the taper were uniform, as in Figure 3, a base diameter of ⅜" and a tip diameter of ⅛", with a length of 2 inches, was found suitable. These varying sizes show that the dimensions are not particularly critical, and may be varied as found advantageous. Consideration of these proportions, however, will show that the mean diameter is preferably one-fourth or less of the length, the range shown being about one-fourth to about one-eighth.

Although a specific construction embodying this invention has been described and illustrated, it is to be understood that the invention is not limited to that specific device, and all such modifications and changes as come within the scope of the appended claims are embraced thereby.

I claim:

1. In apparatus for heating a fluid such as oil, a metal tube in which said fluid is to be heated, and a metal peg secured to the outer surface of said tube, the mean diameter of said peg being about one-fourth to about one-eighth of its length, so that a considerable temperature gradient is maintained along said peg and the amount or length of glow of said peg is indicative of the temperature of said tube.

2. An apparatus according to claim 1, in which the juncture of said peg with said tube is of larger cross-sectional area than the tip of said peg.

3. An apparatus according to claim 1, in which the juncture of said peg with said tube is of larger cross-sectional area than the tip of said peg, the reduction being uniform throughout the length of said peg.

4. An apparatus according to claim 1, in which said peg is progressively reduced in diameter from its base to its outer end.

5. A pressure still tube to which is secured one or more outwardly projecting metal pegs, the mean diameter thereof being about one-fourth to about one-eighth of the length, and so constructed and arranged relative to the tube and the operating temperature thereof that a considerable temperature gradient along said peg or pegs is maintained and the amount and length of glow of said peg or pegs is indicative of the temperature of said pressure still tube.

GEORGE A. DAVIDSON.